(12) United States Patent
Oketani et al.

(10) Patent No.: US 9,762,098 B2
(45) Date of Patent: Sep. 12, 2017

(54) ELECTRIC MOTOR HAVING EMBEDDED PERMANENT MAGNETS

(71) Applicant: Mitsubishi Electric Corporation, Tokyo (JP)

(72) Inventors: Naohiro Oketani, Tokyo (JP); Masahiro Nigo, Tokyo (JP); Kazuhiko Baba, Tokyo (JP); Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 224 days.

(21) Appl. No.: 14/431,077

(22) PCT Filed: Oct. 2, 2013

(86) PCT No.: PCT/JP2013/076816
§ 371 (c)(1),
(2) Date: Mar. 25, 2015

(87) PCT Pub. No.: WO2014/054688
PCT Pub. Date: Apr. 10, 2014

(65) Prior Publication Data
US 2015/0236558 A1 Aug. 20, 2015

(30) Foreign Application Priority Data
Oct. 4, 2012 (WO) .................. PCT/JP2012/075792

(51) Int. Cl.
*H02K 21/12* (2006.01)
*H02K 1/28* (2006.01)
*H02K 1/27* (2006.01)

(52) U.S. Cl.
CPC .............. *H02K 1/28* (2013.01); *H02K 1/276* (2013.01)

(58) Field of Classification Search
CPC ... H02K 1/276; H02K 1/28; H02K 1/27; H02K 15/03
(Continued)

(56) References Cited

U.S. PATENT DOCUMENTS 4,746,827 A * 5/1988 Ochiai ................... H02K 1/278
310/156.22
2002/0171309 A1* 11/2002 Wakui .................. H02K 1/2766
310/156.48
(Continued)

FOREIGN PATENT DOCUMENTS

JP 2003-235189 A 8/2003
JP 2007049805 A * 2/2007
(Continued)

OTHER PUBLICATIONS

JP 2007049805 A_English Machine Translation.*
(Continued)

*Primary Examiner* — Thanh Lam
(74) *Attorney, Agent, or Firm* — Posz Law Group, PLC

(57) ABSTRACT

A rotor of an interior permanent magnet motor includes a rotor core having a plurality of magnet insertion holes, a shaft, a plurality of rare-earth magnets, and a pair of magnet fixing members. One surface of the magnet fixing member is provided with a plurality of pairs of tongue-like portions, and the tongue-like portions are inserted into the magnet insertion holes. On each of both sides in a rotary shaft direction, the rare-earth magnets have both end surfaces in a rotor circumferential direction sandwiched by a corresponding pair of tongue-like portions. An interval between the tongue-like portions includes, at a position separated from a base position, an interval that is smaller than the width of the rare-earth magnet in the rotor circumferential direction.

12 Claims, 8 Drawing Sheets

(58) Field of Classification Search
USPC .................. 310/156.22, 43, 156.53, 156.56
See application file for complete search history.

(56) References Cited

U.S. PATENT DOCUMENTS

2007/0024141 A1* 2/2007 Drexlmaier ............ H02K 1/278
310/156.19
2008/0088193 A1* 4/2008 Tervaskanto ........... H02K 1/278
310/156.22

FOREIGN PATENT DOCUMENTS

| JP | 2007-097293 A | 4/2007 |
|----|---------------|---------|
| JP | 2010-226882 A | 3/2009 |
| JP | 2010-207089 A | 9/2010 |
| JP | 2010-207090 A | 9/2010 |
| JP | 2011-147323 A | 7/2011 |
| JP | 2011-259610 A | 12/2011 |
| JP | 2012-157090 A | 8/2012 |
| KR | 10-2000-0039493 A | 7/2000 |
| KR | 10-0575162 B1 | 4/2006 |

OTHER PUBLICATIONS

Office Action mailed Jul. 18, 2016 in corresponding KR patent application No. 10-2015-7011091 (and English translation).
International Search Report of the International Searching Authority mailed Oct. 29, 2013 for the corresponding international application No. PCT/JP2013/076816 (and English translation).

* cited by examiner

ELECTRIC MOTOR HAVING EMBEDDED PERMANENT MAGNETS

CROSS REFERENCE TO RELATED APPLICATION

This application is a U.S. national stage application of PCT/JP2013/076816 filed on Oct. 2, 2013, and is based on International Patent Application No. PCT/JP2012/075792 filed on Oct. 4, 2012, the contents of which are incorporated herein by reference.

TECHNICAL FIELD

The present invention relates to an interior permanent magnet motor.

BACKGROUND ART

In a general interior permanent magnet motor, as many magnet insertion holes as the number of poles are formed in advance in an axial direction through a rotor core formed by laminating and fixing a plurality of magnetic steel sheets punched into a predetermined shape. When the rotor is assembled, permanent magnets are inserted into corresponding magnet insertion holes.

When the electric motor is operated, forces caused by the change in attracting force between the magnet and a tooth leading end and by the acceleration and deceleration act on the magnet, and hence the magnet may move laterally in a circumferential direction inside the magnet insertion hole. A large amount of movement of the magnet inside the magnet insertion hole causes vibration and noise, which further causes wearing, cracking, and chipping of the magnet. Therefore, in the vicinity of the lateral ends of the magnet insertion hole, steps or projections are often formed as lateral stoppers against the movement of the magnet.

As an example, in Patent Literature 1, there is disclosed a method of fixing the permanent magnet. In this method, projections are formed in the vicinity of the lateral ends of the magnet insertion hole, and the permanent magnet is arranged between the pair of projections. The permanent magnet is sandwiched by the pair of projections in such a mode that the elastic force of the pair of projections acts on the permanent magnet. In this manner, the permanent magnet has been fixed.

However, when the steps or projections are formed in the magnet insertion hole, the distance between the edges of the hole is reduced in this part, and thus the magnetic flux passes across the magnet more easily as compared to the case in the periphery thereof. Therefore, there has been a problem in that, when the magnet is exposed to a magnetic field caused by a winding current of a stator, the magnet tends to demagnetize in the vicinity of the steps or projections of the magnet insertion hole.

CITATION LIST

Patent Literature

[PTL 1] JP 2011-259610 A

SUMMARY OF INVENTION

Technical Problem

The present invention has an object to provide an interior permanent magnet motor capable of reducing the movement of a magnet without relying on steps or projections in the vicinity of lateral ends of a magnet insertion hole, and capable of reducing the risk of noise and wearing, cracking, and chipping of the magnet.

Solution to Problem

In order to achieve the above-mentioned object, according to one embodiment of the present invention, there is provided an interior permanent magnet motor, including: a rotor provided so as to be rotatable; and a stator provided so as to be opposed to the rotor, in which the rotor includes: a rotor core; a shaft for supporting the rotor core; a plurality of permanent magnets embedded in the rotor core; and a pair of magnet fixing members provided to the rotor core, in which the rotor core has a plurality of magnet insertion holes formed therein, in which corresponding one of the permanent magnets is inserted into corresponding one of the magnet insertion holes, in which one surface of each of the magnet fixing members is provided with a plurality of pairs of tongue-like portions, in which, in each of the magnet fixing members, a corresponding pair of tongue-like portions is inserted into corresponding one of the magnet insertion holes so that each of the permanent magnets has both end surfaces in the rotor circumferential direction sandwiched by the corresponding pair of tongue-like portions on each of both sides in the rotary shaft direction, in which an interval between the pair of tongue-like portions includes, at a position separated from a base position and under a state before the corresponding permanent magnet is sandwiched, an interval (Dmin) that is smaller than a width (L) of the permanent magnet in the rotor circumferential direction, and in which an interval (Da) between leading end positions of the pair of tongue-like portions is larger than the width (L) of the permanent magnet in the rotor circumferential direction under the state before the corresponding permanent magnet is sandwiched.

Under a state in which the permanent magnet is inserted between the pair of tongue-like portions until the permanent magnet abuts against the magnet fixing member, a gap may be formed between the permanent magnet and each of the base positions of the pair of tongue-like portions.

When the permanent magnets and the magnet fixing members are assembled to the rotor core, a part of the tongue-like portion may abut against a hole forming surface forming the magnet insertion hole in the rotor core, and another part of the tongue-like portion may abut against the permanent magnet. Alternatively, when the permanent magnets and the magnet fixing members are assembled to the rotor core, the tongue-like portion may abut against the permanent magnet without abutting against a hole forming surface forming the magnet insertion hole in the rotor core.

The plurality of tongue-like portions or each of the magnet fixing members as a whole may be formed by resin molding.

Advantageous Effects of Invention

According to the interior permanent magnet motor of the one embodiment of the present invention, it is possible to reduce the movement of the magnet without relying on the steps or projections in the vicinity of the lateral ends of the magnet insertion hole, and to reduce the risk of noise and wearing, cracking, and chipping of the magnet.

DESCRIPTION OF EMBODIMENTS

Figure 1:
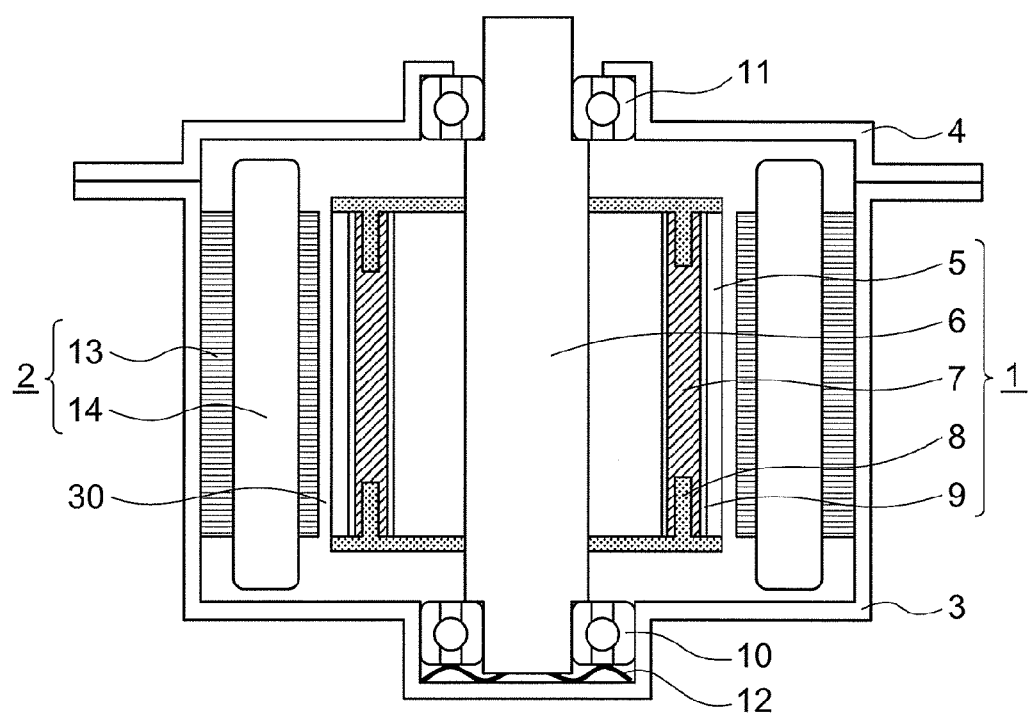
FIG. 1 is a vertical sectional view illustrating a schematic configuration of an interior permanent magnet motor according to a first embodiment of the present invention.

Now, an interior permanent magnet motor according to embodiments of the present invention is described with reference to the accompanying drawings. Note that, in the drawings, the same reference symbols represent the same or corresponding parts.

First Embodiment

FIG. 1 is a vertical sectional view illustrating a schematic configuration of an interior permanent magnet motor according to a first embodiment. The interior permanent magnet motor according to this embodiment includes a rotor 1, a stator 2, a frame 3, and a bracket 4.

The rotor 1 includes a rotor core 5, a shaft 6, a plurality of rare-earth magnets (permanent magnets) 7, and a pair of upper and lower magnet fixing members 8. The rotor core 5 is formed by, for example, laminating and fixing a plurality of magnetic steel sheets punched into a predetermined shape. The rotor core 5 has, for example, a substantially annular shape as viewed in a rotary shaft direction. The rotor core 5 has a plurality of magnet insertion holes 9 formed in parts closer to the outer periphery thereof. As many magnet insertion holes 9 as the number of poles are arranged at, for example, substantially equal intervals in a circumferential direction. Each of the magnet insertion holes 9 extends in the rotary shaft direction, and is opened at both end surfaces of the rotor core 5 in the rotary shaft direction. The rare-earth magnet 7 is inserted into each of the magnet insertion holes 9.

Further, the magnet fixing members 8 are mounted on both the end surfaces of the rotor core 5 in the rotary shaft direction. The pair of magnet fixing members 8 at least partially covers the openings of the plurality of magnet insertion holes 9 in both the end surfaces of the rotor core 5, and prevents the rare-earth magnets 7 from moving in a large amount inside the magnet insertion holes 9. Examples of means for mounting the magnet fixing member 8 to the end surface of the rotor core 5 may include, although not shown, welding, bonding, fastening by forming a through hole and using a bolt or a rivet, and press-fitting by forming a spigot joint portion.

The shaft 6 is fitted into a shaft fitting hole formed in the center of the rotor core 5. The shaft 6 extends along the rotary shaft direction in the rotor core 5, and has one end side rotatably supported by the frame 3 through intermediation of a bearing 10, and the other end side rotatably supported by the bracket 4 through intermediation of a bearing 11. On the bearing surface of the bearing 10, a wave washer 12 for applying a preload is arranged. The shaft 6 has, for example, a circular shape in lateral cross section, and in this case, the shaft fitting hole is also formed into a circular shape in accordance therewith.

The stator 2 includes a stator core 13 and a winding 14. The stator core 13 is formed by, for example, laminating and fixing a plurality of magnetic steel sheets punched into a predetermined shape. The stator core 13 has, for example, a substantially annular shape as viewed in the rotary shaft direction. In parts of the stator core 13 closer to the inner periphery thereof, a plurality of teeth (not shown) are formed. The teeth are positioned at, for example, substantially equal intervals in the circumferential direction. The winding 14 is wound around those teeth via an insulator (not shown). The stator 2 is fixed to the inner side of the frame 3 by methods such as shrink fitting, and is installed so as to be opposed to the rotor 1 with a predetermined air gap 30.

The frame 3 supports one end side of the rotor 1 through intermediation of the bearing 10, and houses the stator 2. The frame 3 has, for example, a substantially cylindrical shape. One end of the frame 3 in the axial direction is opened to have a flange shape, and the other end thereof has a bottom.

The bracket 4 supports the other end side of the rotor 1 through intermediation of the bearing 11. The bracket 4 has, for example, a substantially cylindrical shape as viewed in the rotary shaft direction. One end of the bracket 4 in the rotary shaft direction is opened to have a flange shape, and the other end thereof has a hole formed therein so as to allow the output end of the shaft 6 to protrude therefrom. The bracket 4 and the frame 3 are coupled to each other with fastening means (not shown) such as screws while abutting together the flange parts formed therein. Note that, in the first embodiment, the other end of the rotor 1 supported by the bearing 11 inside the bracket 4 corresponds to, but not particularly limited to, the load side for inputting and outputting torque to and from the electric motor.

Figure 2:
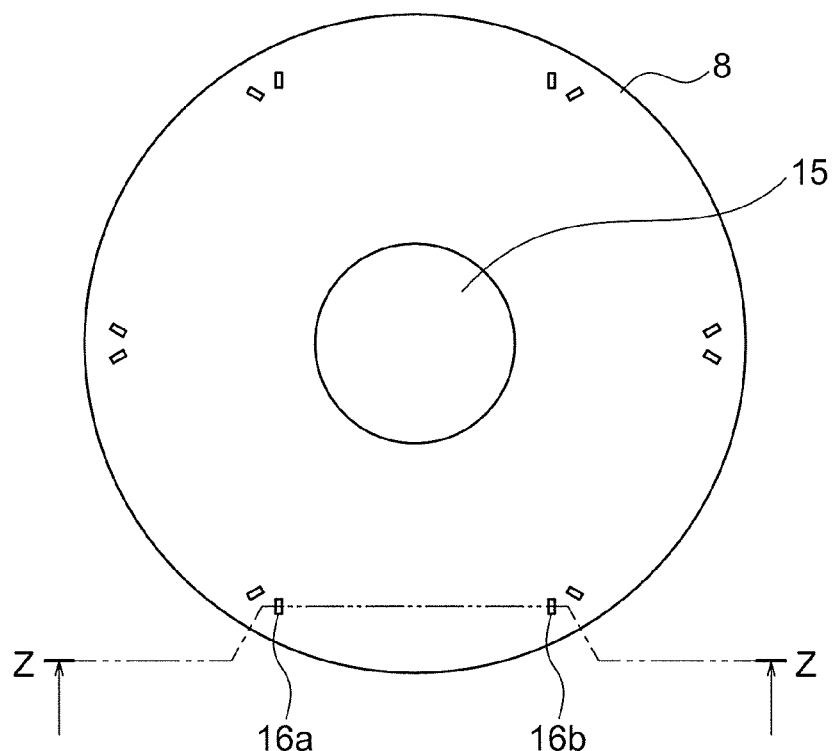
FIG. 2 is a plan view of a single magnet fixing member before being assembled to a rotor.
Figure 3:
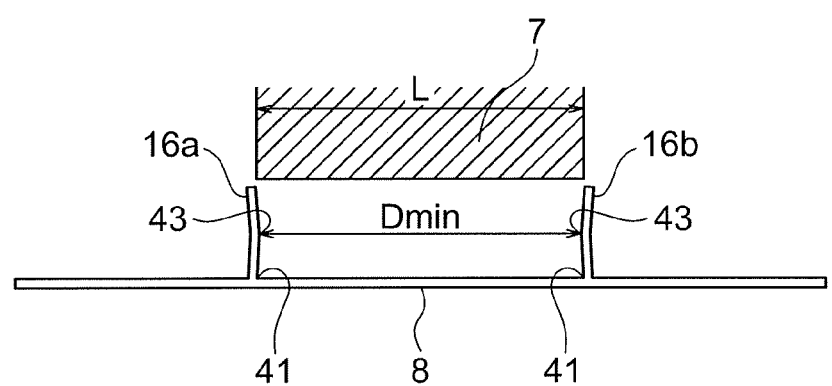
FIG. 3 is a sectional view taken along the line Z-Z of FIG. 2.
Figure 4:
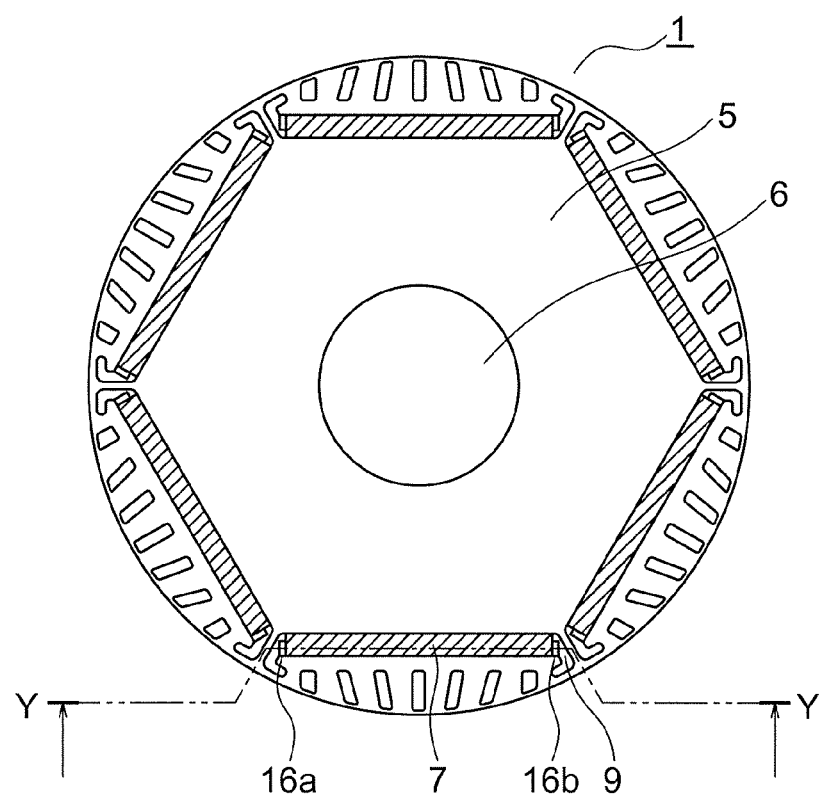
FIG. 4 is a lateral sectional view of the rotor.
Figure 5:
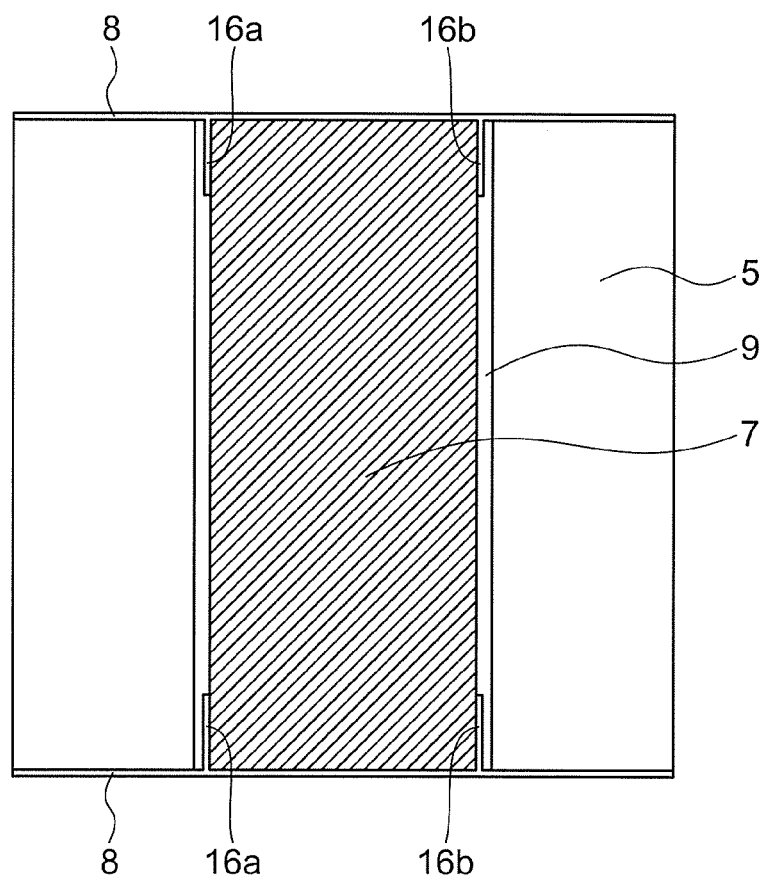
FIG. 5 is a sectional view taken along the line Y-Y of FIG. 4.

Now, the rotor 1 is described in detail assuming a case where, as an example, the rotor 1 is a six-pole rotor, in other words, there are six rare-earth magnets 7. FIG. 2 is a plan view of the single magnet fixing member before being assembled to the rotor. FIG. 3 is a sectional view taken along the line Z-Z of FIG. 2. FIG. 4 is a lateral sectional view of the rotor. FIG. 5 is a sectional view taken along the line Y-Y of FIG. 4. Note that, in FIG. 3, for easy understanding of the description of the dimension relationship, (a part of) the cross section of the rare-earth magnet is illustrated near the tongue-like portions.

Each of the magnet fixing members 8 has a circular plate shape, and for example, has an outer diameter equal to or slightly smaller than the outer circumference of the rotor 1. Further, a shaft insertion hole 15 is formed at the center portion of each of the magnet fixing members 8. On one surface of each of the magnet fixing members 8, a plurality of pairs of tongue-like portions 16a and 16b made of a non-magnetic material are formed so as to extend toward the magnet insertion holes 9 when being assembled. In other words, the plurality of pairs of tongue-like portions 16a and 16b rise from one surface of the corresponding magnet fixing member 8 substantially perpendicularly to the one surface (substantially in the rotary shaft direction). One pair of tongue-like portions 16a and 16b corresponds to one pole. Therefore, as described above, in the illustrated example, the number of poles is six, and hence six pairs of (a total of twelve) tongue-like portions are formed. Further, as an example, each of the tongue-like portions 16a and 16b is formed to have a rectangular cross section in view of across section having the rotary shaft of the rotor as the normal.

The positions of the six pairs of tongue-like portions 16a and 16b in the plate plane are set in advance so that, when the pair of magnet fixing members 8 is installed to the corresponding end surfaces of the rotor core 5, the pair of tongue-like portions 16a and 16b abuts against both the end surfaces of the rare-earth magnet 7 in the rotor circumferential direction. In more detail, each of the pairs of tongue-like portions 16a and 16b is formed so as to obtain a state in which the pair of tongue-like portions 16a and 16b abuts against both end surfaces of the corresponding rare-earth magnet 7 in the rotor circumferential direction so that the pair of tongue-like portions 16a and 16b sandwiches the corresponding rare-earth magnet 7 in the rotor circumferential direction.

Further, in each pair, the interval of the pair of tongue-like portions 16a and 16b (interval in a single state before the rare-earth magnet 7 is sandwiched) is as follows. Base positions 41 with respect to the plate surface have an interval equal to or larger than a lateral width (width that is an internal between both end surfaces in the rotor circumferential direction) L of the rare-earth magnet 7, and gripping positions 43 rising from the base positions 41 in a direction to separate from the plate surface have an interval Dmin that is slightly smaller than the lateral width L of the rare-earth magnet 7 in a state before the rare-earth magnet 7 is sandwiched. That is, the pair of tongue-like portions 16a and 16b includes positions where the interval therebetween satisfies Dmin<L.

Each pair of tongue-like portions 16a and 16b is formed with such an interval. Thus, when the rare-earth magnets 7 and the magnet fixing members 8 are assembled to the rotor core 5, the distance between each pair of tongue-like portions 16a and 16b is increased by the rare-earth magnet 7, and an elastic restoring force is generated in the tongue-like portions 16a and 16b in a direction to sandwich the rare-earth magnet 7. With this elastic restoring force, the rare-earth magnet 7 is gripped inside the magnet insertion hole 9, which suppresses abrupt movement and movement in a large amount of the rare-earth magnet 7.

Figure 6:
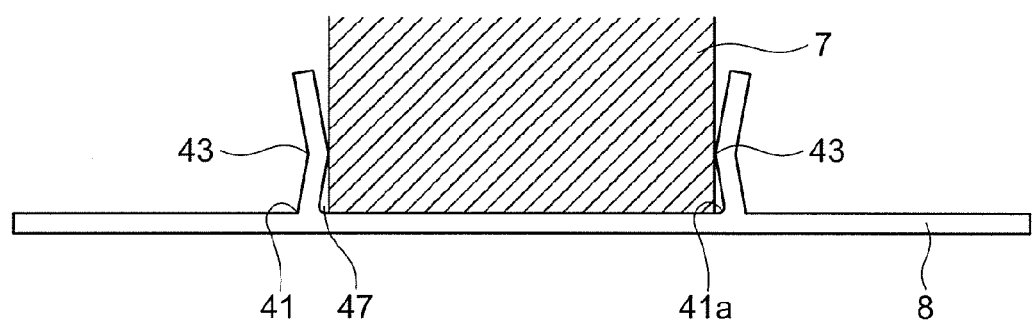
FIG. 6 is a view illustrating a state in which a magnet is inserted between a pair of tongue-like portions until the magnet abuts against the magnet fixing member in FIG. 3.

FIG. 6 is a view illustrating a state in which the magnet is inserted between the pair of tongue-like portions until the magnet abuts against the magnet fixing member in FIG. 3. In the pair of tongue-like portions 16a and 16b, corner portions 41a at the base position 41 on the magnet side are each formed into a rounded shape. Further, as described above, the interval between the pair of tongue-like portions 16a and 16b is reduced from the pair of base positions 41 toward the pair of gripping positions 43. Therefore, as illustrated in FIG. 6, under a state in which the rare-earth magnet 7 is inserted between the pair of tongue-like portions 16a and 16b until the end surface of the rare-earth magnet 7 abuts against the magnet fixing member 8, a gap 47 is formed between the rare-earth magnet 7 and each of the base positions 41 of the pair of tongue-like portions 16a and 16b.

With such a configuration, when the pair of tongue-like portions 16a and 16b grips the rare-earth magnet 7, generation of concentrated stress at the base positions 41 of the pair of tongue-like portions 16a and 16b is suppressed, and the mechanical durability at the base positions 41 of the tongue-like portions 16a and 16b can be improved. Further, fluctuations in width dimension of the rare-earth magnet 7 and in distance between each pair of tongue-like portions 16a and 16b can be absorbed. In this manner, the interference between a corner portion of the leading end of the rare-earth magnet 7 and each of the pair of tongue-like portions 16a and 16b can be reliably avoided. Therefore, there is also an advantage in that chamfering is unnecessary on the corner portion of the leading end of the magnet, and thus the cost necessary for manufacturing the magnet can be suppressed.

Figure 7:
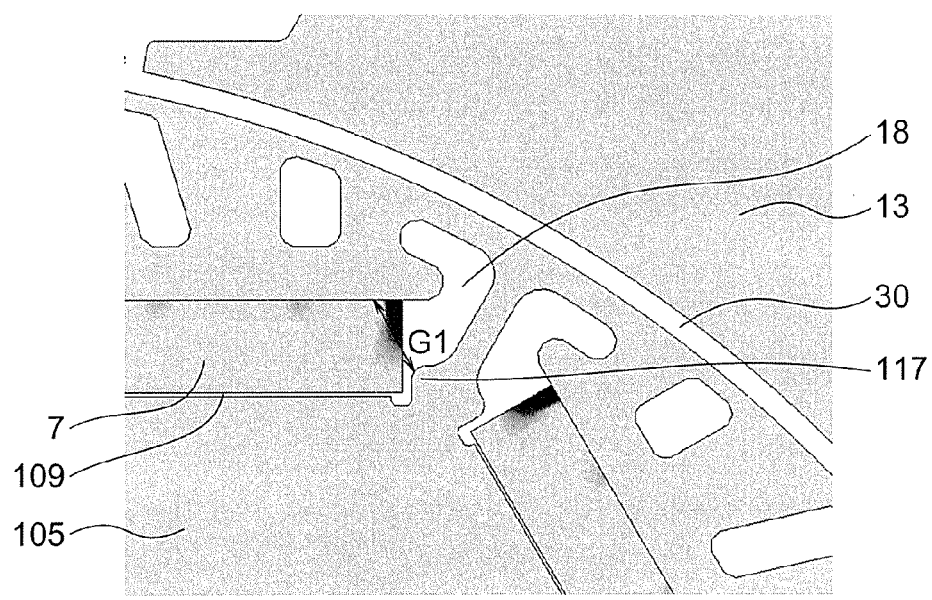
FIG. 7 is a contour diagram illustrating, as a comparative example, a demagnetized region when steps are formed in the vicinity of lateral ends of a magnet insertion hole of a rotor core.
Figure 8:
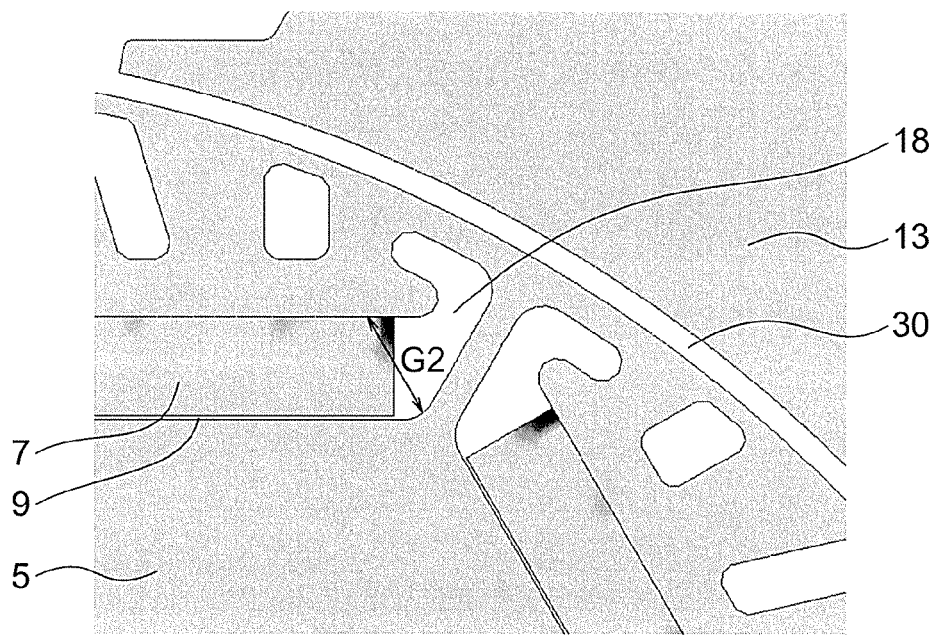
FIG. 8 is a contour diagram illustrating a demagnetized region in the first embodiment when steps are not formed in the vicinity of the lateral ends of the magnet insertion hole.

When the rare-earth magnet is exposed to a strong demagnetizing field under high temperature, irreversible demagnetization tends to occur. An interior permanent magnet motor using rare-earth magnets is designed so as to prevent development of demagnetization above a certain level in the use conditions. FIG. 7 is a contour diagram illustrating, as a comparative example, a demagnetized region when steps 117 are formed in the vicinity of lateral ends of a magnet insertion hole 109 of a rotor core 105. FIG. 8 is a contour diagram illustrating a demagnetized region in the first embodiment when steps are not formed in the vicinity of the lateral ends of the magnet insertion hole. Note that, the magnetization direction of the rare-earth magnet is the thickness direction of the magnet (direction from one long side to the other long side in lateral sectional view). Further, FIGS. 7 and 8 illustrate results through electromagnetic analyses in which conditions other than the shape of the magnet insertion hole are set the same, and represent that, as the black color is darker, the demagnetizing factor is larger in the part.

As is understood from the comparison between FIGS. 7 and 8, the lateral end portions of the rare-earth magnet 7 are less demagnetized in FIG. 8 in which steps are not formed in the vicinity of the lateral ends of the magnet insertion hole 9 than in FIG. 7 in which the steps 117 are formed in the vicinity of the lateral ends of the magnet insertion hole 109. The magnetic flux caused by the current flowing through the winding 14 flows near the outer peripheral surface of the rotor core in the circumferential direction. However, when passing an air portion (flux barrier) 18 between the poles, the magnetic flux selectively flows in a larger amount at a position where the distance between the edges of the magnet insertion hole is small. Therefore, based on the presence or absence of the steps 117, the relationship of parts represented by symbols G1 and G2 in FIGS. 7 and 8 satisfies G1<G2. As a result, when the steps 117 are formed, a larger amount of magnetic flux passes the end portion of the rare-earth magnet 7 against the magnetization direction (thickness direction of the magnet), which causes more demagnetization.

Note that, in this embodiment, the rare-earth magnet is used as the permanent magnet, but similar effects can be obtained even when other types of magnets are used. For example, in a case of a ferrite magnet, the ferrite magnet differs from the rare-earth magnet only in that the irreversible demagnetization tends to occur when the magnet is exposed to a strong demagnetizing field under low temperature. When the present invention is applied, similar effects can be obtained also in the case of the ferrite magnet.

Figure 9:
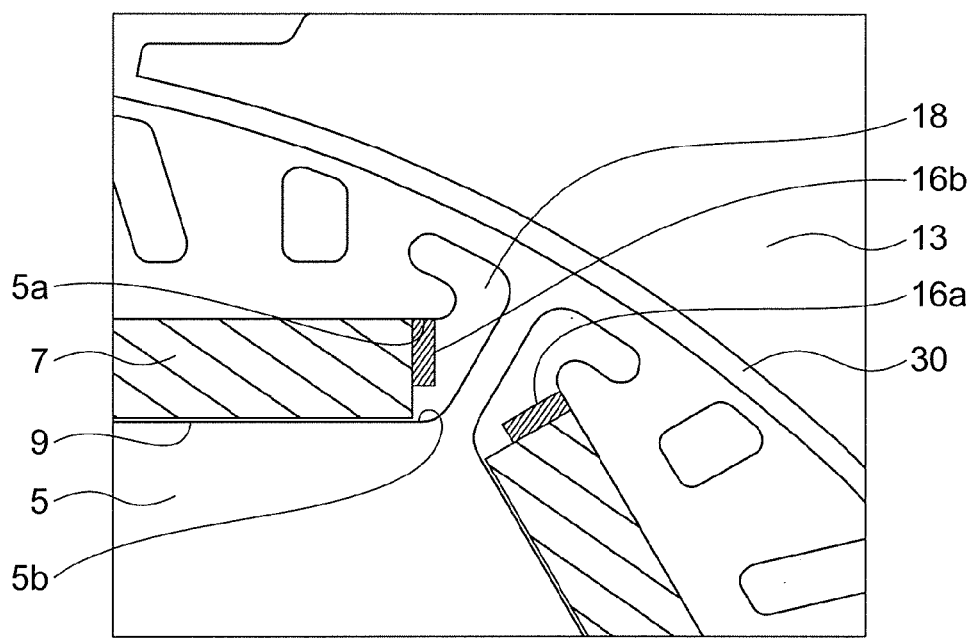
FIG. 9 is a view illustrating, in an enlarged manner, the vicinity of the tongue-like portions in FIG. 4.
Figure 10:
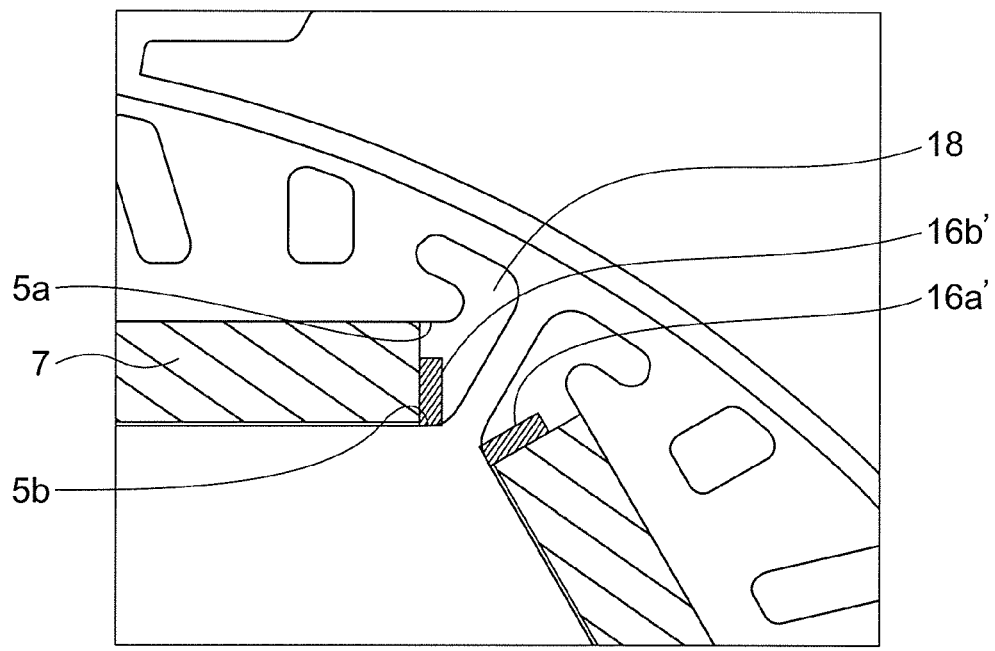
FIG. 10 is a view illustrating a modified example of FIG. 9.

FIG. 9 is a view illustrating, in an enlarged manner, the vicinity of the tongue-like portions in FIG. 4. When the rare-earth magnets 7 and the magnet fixing members 8 are assembled to the rotor core 5, parts of each pair of tongue-like portions 16a and 16b abut against hole forming surfaces that form the magnet insertion holes 9 in the rotor core 5, and other parts of each pair of tongue-like portions 16a and 16b abut against the rare-earth magnets 7. The example illustrated in FIG. 9 is referred to for specific description. One surface of each of the tongue-like portions 16a and 16b having a rectangular cross section as described above abuts against a hole forming surface 5a forming a radially outer side of the magnet insertion hole 9 in the rotor core 5, and another surface of each of the tongue-like portions 16a and 16b abuts against a corresponding end surface of the rare-earth magnet 7 in the lateral direction. Note that, a modified example of FIG. 9 is illustrated in FIG. 10. In the specific example illustrated in FIG. 10, one surface of each of tongue-like portions 16a' and 16b' abuts against a hole forming surface 5b forming a radially inner side of the magnet insertion hole 9 in the rotor core 5, and another surface of each of the tongue-like portions 16a' and 16b' abuts against a corresponding end surface of the rare-earth magnet 7 in the lateral direction. With such a configuration, a relative position of the magnet fixing member 8 with respect to the edge of the magnet insertion hole 9 is determined, and hence the rare-earth magnet 7 can be easily positioned relatively to the magnet insertion hole 9. In particular, the relative position in the rotor circumferential direction between the magnet insertion hole 9 and the rare-earth magnet 7 is very important. For example, when the rare-earth magnet 7 is shifted on the right side inside the magnet insertion hole 9, the right side end portion of the rare-earth magnet 7 approaches the right end edge of the magnet insertion hole 9, which may cause a problem of reduction in demagnetization durability. In contrast, in this embodiment, the rare-earth magnet is positioned by the pair of tongue-like portions, and further those tongue-like portions are positioned by the hole forming surface of the rotor core. Therefore, the rare-earth magnet 7 can be easily positioned at the center of the magnet insertion hole 9, and the problem of reduction in demagnetization durability on one side as described above can be avoided. Note that, in this embodiment, as for one pole, the rare-earth magnet 7, the magnet insertion hole 9, the air portions 18 to be described later, and the pair of tongue-like portions 16a and 16b are formed in line symmetry with respect to the magnetic center line in FIGS. 9 and 10.

According to the interior permanent magnet motor of the first embodiment configured as described above, the permanent magnet is pressed by the tongue-like portions made of a non-magnetic material of the magnet fixing members, which are separate members from the rotor core, from both sides in the rotary shaft direction in the rotor core. Thus, without relying on steps or projections in the vicinity of the lateral ends of the magnet insertion hole, the movement of the magnet can be reduced, and the risk of noise and wearing, cracking, and chipping of the magnet, which are caused by movement in a large amount of the magnet, can be reduced. That is, the risk of noise and wearing, cracking, and chipping of the magnet can be reduced while suppressing demagnetization of the lateral end portions of the permanent magnet. Further, in the first embodiment, the permanent magnet is held under a state in which the elastic restoring force of the tongue-like portions acts on the permanent magnet, and hence the permanent magnet and the tongue-like portions are constantly maintained in a close contact state. Even with this, the risk of noise and wearing, cracking, and chipping of the magnet can be reduced.

Second Embodiment

Figure 11:
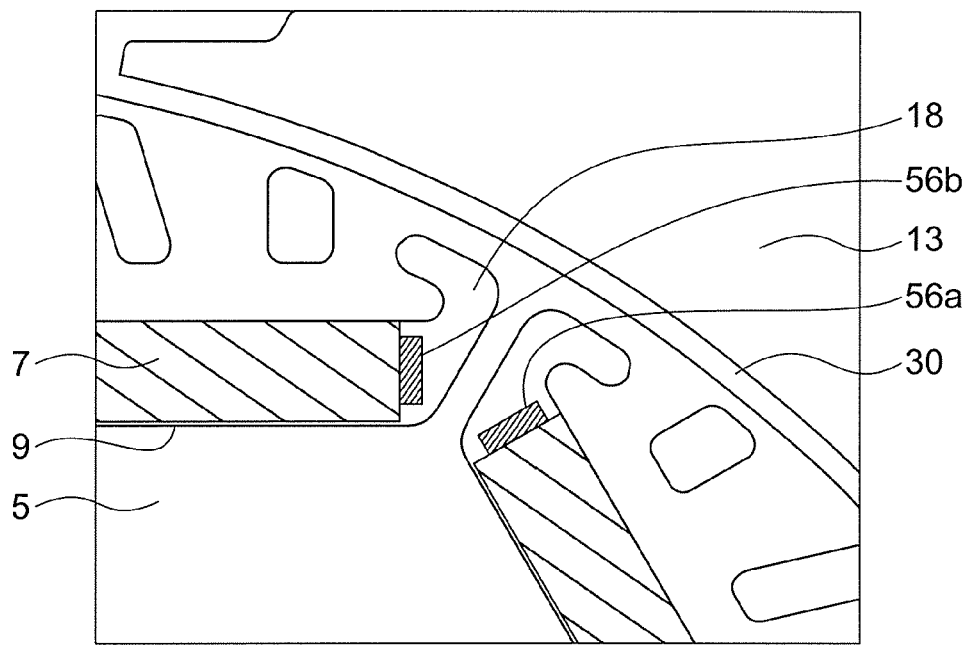
FIG. 11 is a view in the same mode as FIG. 9 according to a second embodiment.

Next, with reference to FIG. 11, a second embodiment of the present invention is described. FIG. 11 is a view in the same mode as FIG. 9 according to the second embodiment. Note that, the second embodiment is similar to the above-mentioned first embodiment except for the part described below. As illustrated in FIG. 11, in this embodiment, when the rare-earth magnets 7 and the magnet fixing members 8 are assembled to the rotor core 5, each pair of tongue-like portions 56a and 56b abuts against the rare-earth magnet 7 without abutting against the hole forming surface forming the magnet insertion hole 9.

According to the second embodiment configured as described above, the following advantages can be obtained. That is, in the second embodiment, in a step of assembling the rotor (step of inserting the rare-earth magnets into the magnet insertion holes, and then inserting the magnet fixing members from both the end surfaces in the rotary shaft direction, to thereby grip two side surfaces of the rare-earth magnet in the width direction), the distance between the tongue-like portion and the edge of the magnet insertion hole can be sufficiently secured. Therefore, the assembly is facilitated because the tongue-like portion is not caught, and thus productivity is enhanced. Further, when the magnet fixing member is made of a material that allows electricity to pass easily, such as steel sheets, there arises a problem in that, when the tongue-like portion of the magnet fixing member abuts against the edge of the magnet insertion hole, the laminated and fixed magnetic steel sheets are electrically connected to each other to increase eddy-current loss. In this embodiment, however, a sufficient distance is secured between the tongue-like portion and the edge of the magnet insertion hole, and hence such a problem can be prevented in advance.

Third Embodiment

Figure 12:
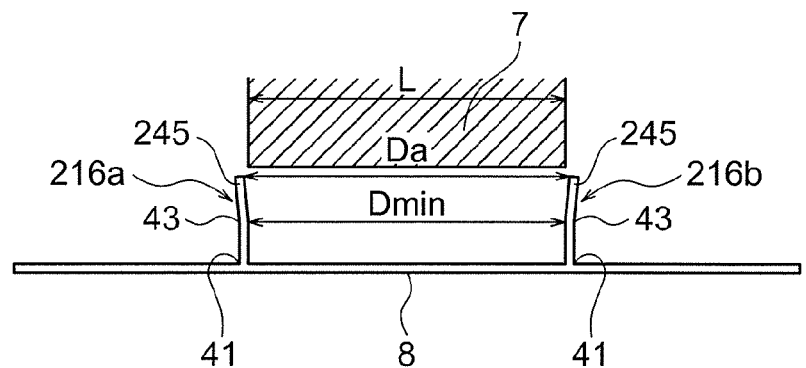
FIG. 12 is a view in the same mode as FIG. 3 according to a third embodiment.

Next, with reference to FIG. 12, a third embodiment of the present invention is described. FIG. 12 is a view in the same mode as FIG. 3 according to the third embodiment. Note that, the third embodiment is similar to the above-mentioned first and second embodiments except for the part described below.

As illustrated in FIG. 12, a pair of tongue-like portions 216a and 216b formed in each of the magnet fixing members 8 includes the base positions 41 and the gripping positions 43 (interval: Dmin) with intervals similar to those in the case of the above-mentioned tongue-like portions 16a and 16b. Further, leading end positions 245 of the tongue-like portions 216a and 216b have an interval Da larger than the lateral width L of the rare-earth magnet 7. That is, the interval Da between the leading end positions 245 of the tongue-like portions 216a and 216b and the lateral width L of the rare-earth magnet 7 are set so as to satisfy the relationship of Da>L.

According to the third embodiment configured as described above, in addition to the advantages in the first embodiment or the second embodiment described above, the following advantages can be obtained. That is, when the rare-earth magnet 7 enters a space between the pair of tongue-like portions 216a and 216b, due to the interval set for the leading end positions 245 described above, the rare-earth magnet 7 is smoothly arranged between the pair of tongue-like portions 216a and 216b. Therefore, the assembly of the rare-earth magnets 7 and the magnet fixing members 8 is facilitated. Note that, as a method of increasing the space between the leading end portions of the tongue-like portions 216a and 216b, in addition to a mode of forming the leading end portions into a tapered shape as illustrated in FIG. 12, for example, there is a mode of forming corner portions on the inner side of the leading ends of the tongue-like portions 216a and 216b into a chamfered shape or a rounded shape.

Fourth Embodiment

Next, a fourth embodiment of the present invention is described. The fourth embodiment has a feature in that the plurality of tongue-like portions or each of the magnet fixing members as a whole is formed by resin molding. The illustrated example is described by applying the feature of the fourth embodiment to the structure of the above-mentioned first embodiment, but the fourth embodiment is not limited thereto. The present invention can be carried out by applying resin molding to the structure of the second embodiment or the third embodiment described above.

Figure 13:
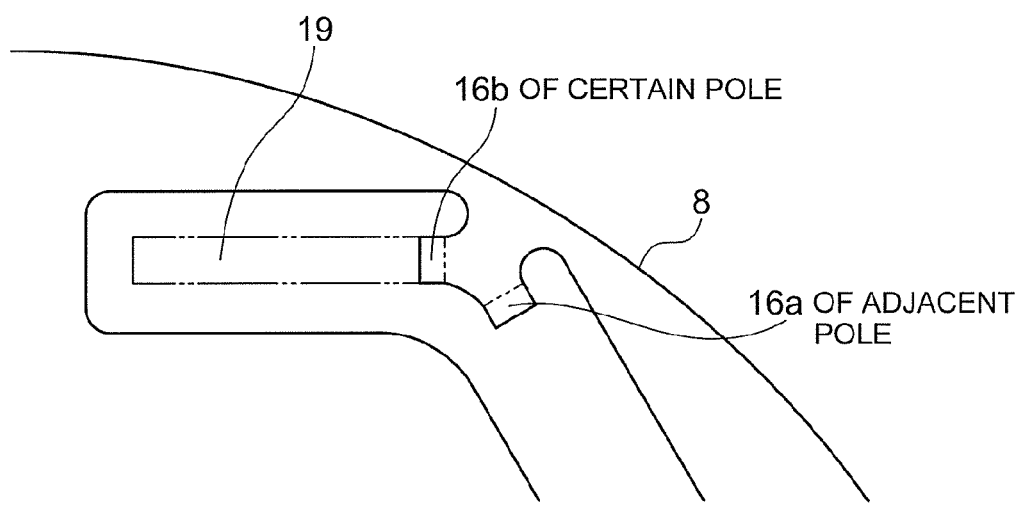
FIG. 13 is a view illustrating the cutting layout when the tongue-like portions are formed by sheet metal working and bending.

In the interior permanent magnet motor, it is possible to assume a case where, for the purpose of preventing the rare-earth magnet from slipping out in the axial direction and preventing scattering of broken pieces when cracking or chipping occurs, metal sheets made of a non-magnetic material, which are called end plates, are placed on both the end surfaces of the rotor core in the axial direction, to thereby close the opening portions of the magnet insertion holes. Therefore, as the magnet fixing members 8 in the above-mentioned first to third embodiments, it is conceivable to employ a method of forming the tongue-like portions 16a and 16b by subjecting such metal end plates to sheet metal working. In this case, however, the following circumstance occurs due to the cutting layout. FIG. 13 is a view illustrating the cutting layout when the tongue-like portions are formed by sheet metal working and bending.

That is, the tongue-like portion 16b for pressing the right end surface of the rare-earth magnet 7 of a certain pole is positioned in the vicinity of a region between the poles, and hence the tongue-like portion 16b and the tongue-like portion 16a for pressing the left end surface of the rare-earth magnet 7 of the adjacent pole scramble for a material. In order to avoid this, as illustrated in FIG. 13, the tongue-like portion 16b is required to be formed by bending a material 19 on the left side part thereof. As a result, the lateral end portions of the rare-earth magnet 7 can be gripped, but apart of the axial end surface of the rare-earth magnet 7 is exposed. Therefore, if cracking or chipping occurs in the rare-earth magnet 7 due to some factors or accidents, the role to prevent scattering of the broken pieces is slightly reduced. In order to prevent such a problem, in the fourth embodiment, the tongue-like portions 16a and 16b or the entire magnet fixing member 8 is formed by resin molding so as to solve the above-mentioned problem without increasing the manufacture cost, and the pair of magnet fixing members 8 can substantially completely cover the openings of the plurality of magnet insertion holes 9 at both the end surfaces of the rotor core 5.

Although the details of the present invention are specifically described above with reference to the preferred embodiments, it is apparent that persons skilled in the art may adopt various modifications based on the basic technical concepts and teachings of the present invention.

REFERENCE SIGNS LIST 1 rotor, 2 stator, 5 rotor core, 6 shaft, 7 rare-earth magnet (permanent magnet), 8 magnet fixing member, 9 magnet insertion hole, 16a, 16b, 16a', 16b', 56a, 56b, 216a, 216b tongue-like portion, 41 base position

The invention claimed is:
1. An interior permanent magnet motor, comprising:
a rotor provided so as to be rotatable; and
a stator provided so as to be opposed to the rotor,
wherein the rotor comprises:
 a rotor core;
 a shaft for supporting the rotor core;
 a plurality of permanent magnets embedded in the rotor core; and
 a pair of magnet fixing members provided on both end surfaces of the rotor core in a rotary shaft direction,
wherein the rotor core has a plurality of magnet insertion holes formed therein,
wherein corresponding one of the permanent magnets is inserted into corresponding one of the magnet insertion holes,
wherein one surface of each of the magnet fixing members is provided with a plurality of pairs of tongue-like portions,
wherein, in each of the magnet fixing members, a corresponding pair of tongue-like portions is inserted into corresponding one of the magnet insertion holes so that each of the permanent magnets has both end surfaces in the rotor circumferential direction sandwiched by the corresponding pair of tongue-like portions on each of both sides in the rotary shaft direction,
wherein an interval between the pair of tongue-like portions comprises, at a position separated from a base position and under a state before the corresponding permanent magnet is sandwiched, an interval (Dmin) that is smaller than a width (L) of the permanent magnet in the rotor circumferential direction,
wherein an interval (Da) between leading end positions of the pair of tongue-like portions is larger than the width (L) of the permanent magnet in the rotor circumferential direction under the state before the corresponding permanent magnet is sandwiched,
wherein, under a state in which the permanent magnet is inserted between the pair of tongue-like portions until the permanent magnet abuts against the magnet fixing member, a gap is formed between the permanent magnet and each of the base positions of the pair of tongue-like portions.

2. An interior permanent magnet motor according to claim 1, wherein, when the permanent magnets and the magnet fixing members are assembled to the rotor core, a part of the tongue-like portion abuts against a hole forming surface forming the magnet insertion hole in the rotor core, and another part of the tongue-like portion abuts against the permanent magnet.

3. An interior permanent magnet motor according to claim 1, wherein, when the permanent magnets and the magnet fixing members are assembled to the rotor core, the tongue-like portion abuts against the permanent magnet without abutting against a hole forming surface forming the magnet insertion hole in the rotor core.

4. An interior permanent magnet motor according to claim 1, wherein the plurality of tongue-like portions or each of the magnet fixing members as a whole is formed by resin molding.

5. An interior permanent magnet motor according to claim 1, wherein each gap is located in a rotor circumferential direction with respect to the permanent magnet.

6. An interior permanent magnet motor according to claim 1, wherein,
the permanent magnet is inserted between the pair of tongue-like portions such that the permanent magnet abuts against the magnet fixing member,
a first gap is formed between the permanent magnet and a first base position of a first tongue-like portion of the pair of tongue-like portions, and
a second gap, different from the first gap, is formed between the permanent magnet and a second base position of a second tongue-like portion of the pair of tongue-like portions.

7. An interior permanent magnet motor according to claim 6, wherein,
the first gap is enclosed by the permanent magnet, the magnet fixing member, and the first tongue-like portion, and
the second gap is enclosed by the permanent magnet, the magnet fixing member, and the second tongue-like portion.

8. An interior permanent magnet motor according to claim 6, wherein
the first gap is located in a first rotor circumferential direction with respect to the permanent magnet, and
the second gap is located in a second rotor circumferential direction with respect to the permanent magnet.

9. An interior permanent magnet motor, comprising:
a rotor provided so as to be rotatable; and
a stator provided so as to be opposed to the rotor,
wherein the rotor comprises:
  a rotor core;
  a shaft for supporting the rotor core;
  a plurality of permanent magnets embedded in the rotor core; and
  a pair of magnet fixing members provided on both end surfaces of the rotor core in a rotary shaft direction,
wherein the rotor core has a plurality of magnet insertion holes formed therein,
wherein corresponding one of the permanent magnets is inserted into corresponding one of the magnet insertion holes,
wherein one surface of each of the magnet fixing members is provided with a plurality of pairs of tongue-like portions,
wherein, in each of the magnet fixing members, a corresponding pair of tongue-like portions is inserted into corresponding one of the magnet insertion holes so that each of the permanent magnets has both end surfaces in the rotor circumferential direction sandwiched by the corresponding pair of tongue-like portions on each of both sides in the rotary shaft direction,
wherein an interval between the pair of tongue-like portions comprises, at a position separated from a base position and under a state before the corresponding permanent magnet is sandwiched, an interval (Dmin) that is smaller than a width (L) of the permanent magnet in the rotor circumferential direction,
wherein an interval (Da) between leading end positions of the pair of tongue-like portions is larger than the width (L) of the permanent magnet in the rotor circumferential direction under the state before the corresponding permanent magnet is sandwiched,
under a state in which the permanent magnet is inserted between the pair of tongue-like portions until the permanent magnet abuts against the magnet fixing member, gaps are formed between the permanent magnet and respective base positions of the pair of tongue-like portions.

10. An interior permanent magnet motor according to claim 9, wherein, each of the gaps is enclosed by the permanent magnet, the magnet fixing member, and one of the pair of tongue-like portions.

11. An interior permanent magnet motor according to claim 9, wherein each of the gaps is located in a rotor circumferential direction with respect to the permanent magnet.

12. An interior permanent magnet motor according to claim 9, wherein,
the permanent magnet is inserted between the pair of tongue-like portions such that the permanent magnet abuts against the magnet fixing member,
a first gap is formed between the permanent magnet and a first base position of a first tongue-like portion of the pair of tongue-like portions, and
a second gap, different from the first gap, is formed between the permanent magnet and a second base position of a second tongue-like portion of the pair of tongue-like portions.

* * * * *